(12) United States Patent
Saito et al.

(10) Patent No.: US 10,326,333 B2
(45) Date of Patent: Jun. 18, 2019

(54) GEARED MOTOR AND DAMPER DEVICE

(71) Applicant: NIDEC SANKYO CORPORATION, Suwa-gun, Nagano (JP)

(72) Inventors: Shunji Saito, Nagano (JP); Manabu Sakamoto, Nagano (JP); Katsuhiko Hayashi, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 637 days.

(21) Appl. No.: 14/837,248

(22) Filed: Aug. 27, 2015

(65) Prior Publication Data
US 2016/0065033 A1 Mar. 3, 2016

(30) Foreign Application Priority Data

Aug. 28, 2014 (JP) ................. 2014-174479

(51) Int. Cl.
| | |
|---|---|
| *H02K 7/116* | (2006.01) |
| *H02K 5/04* | (2006.01) |
| *H02K 1/14* | (2006.01) |
| *H02K 3/52* | (2006.01) |
| *H02K 5/22* | (2006.01) |

(52) U.S. Cl.
CPC .......... *H02K 7/116* (2013.01); *H02K 1/145* (2013.01); *H02K 5/04* (2013.01); *H02K 3/525* (2013.01); *H02K 5/225* (2013.01)

(58) Field of Classification Search
CPC ........ H02K 7/116; H02K 7/145; H02K 1/145; H02K 5/04
USPC ............. 310/49.01–49.55, 257, 83, 99, 89
See application file for complete search history.

(56) References Cited

U.S. PATENT DOCUMENTS

| 5,043,613 A | * | 8/1991 | Kurata | ............... H02K 7/116 310/49.13 |
| 2007/0022597 A1 | * | 2/2007 | Shimura | ............ H02K 1/145 29/596 |
| 2009/0066196 A1 | * | 3/2009 | Suzuki | ............. H02K 5/1672 310/49.36 |

FOREIGN PATENT DOCUMENTS

JP H10325669 A 12/1998

\* cited by examiner

*Primary Examiner* — Thomas Truong
(74) *Attorney, Agent, or Firm* — Cantor Colburn LLP

(57) ABSTRACT

A geared motor may include a first case member, a support member disposed on one side in a motor axial line direction with respect to the first case member and connected with the first case member, a stator in a tube shape disposed between the first case member and the support member, a rotor disposed on an inner side with respect to the stator, a rotor support shaft rotatably supporting the rotor, and a gear train structured to transmit rotation of the rotor. The first case member may be provided with a radial direction positioning part which positions the stator in a radial direction and a first support part for the rotor support shaft which supports an end part on the other side in the motor axial line direction of the rotor support shaft.

11 Claims, 9 Drawing Sheets

GEARED MOTOR AND DAMPER DEVICE

CROSS REFERENCE TO RELATED APPLICATION

The present invention claims priority under 35 U.S.C. § 119 to Japanese Application No. 2014-174479 filed Aug. 28, 2014, the entire content of which is incorporated herein by reference.

FIELD OF THE INVENTION

At least an embodiment of the present invention may relate to a geared motor including a gear train and the like in an inside of a case and may relate to a damper device which is used in a cold air passage of a refrigerator or the like.

BACKGROUND

In a damper device which is used in a cold air passage of a refrigerator or the like, for example, a structure has been proposed that a baffle is driven by a baffle drive mechanism including a motor and a gear train to open and close an opening part formed in a frame, and the baffle drive mechanism is accommodated within a case to structure a geared motor (see Japanese Patent Laid-Open No. Hei 10-325669).

In the geared motor and the damper device, a stator, a rotor and a rotor support shaft are required to be disposed in an inside of a case to structure a motor. In this case, in the geared motor and the damper device described in the above-mentioned Patent Literature, end plates are fixed to both ends of the stator by welding or the like and the stator, the rotor and the rotor support shaft are arranged within the case through the end plates. Further, an end plate fixed to an end face on an opposite-to-output side of the stator supports an end part of the rotor support shaft, and an end plate fixed to an end face on an output side of the stator is utilized as a base plate which supports an end part of a support shaft of a first gear.

However, in the structure described in the above-mentioned Patent Literature, first, since two end plates are used, the number of components is increased. Further, in the structure described in the above-mentioned Patent Literature, processes for fixing two end plates are required. In addition, when an end plate is to be fixed, high positional accuracy is required between a stator core used in the stator and the end plate and thus much labor is required for fixing the end plate. Therefore, in the structure described in the above-mentioned Patent Literature, manufacturing cost of the damper device and the geared motor is increased.

SUMMARY

In view of the problem described above, at least an embodiment of the present invention may advantageously provide a geared motor and a damper device which are capable of reducing their costs.

According to at least an embodiment of the present invention, there may be provided a geared motor including a first case member, a support member which is disposed on one side in a motor axial line direction with respect to the first case member and is connected with the first case member, a stator in a tube shape which is disposed between the first case member and the support member, a rotor which is disposed on an inner side with respect to the stator, a rotor support shaft which rotatably supports the rotor, and a gear train structured to transmit rotation of the rotor. The first case member is provided with a radial direction positioning part which positions the stator in a radial direction and a first support part for the rotor support shaft which supports an end part on the other side in the motor axial line direction of the rotor support shaft.

In at least an embodiment of the present invention, the stator is positioned in the radial direction by the radial direction positioning part of the first case member, and the rotor support shaft is supported by the first support part for the rotor support shaft of the first case member. Therefore, the stator and the rotor support shaft are positioned through the first case member with a high degree of accuracy and thus the stator and the rotor support shaft are not required to be positioned by an end plate which is fixed to an end face of the stator. Accordingly, the number of components is reduced and productivity is improved and thus cost of the geared motor can be reduced.

In at least an embodiment of the present invention, the stator includes a first stator core formed with a plurality of first pole teeth in a circumferential direction which are protruded toward the one side from an inner circumferential edge of a first flange part in a ring shape at an end part on the other side of the stator, and the radial direction positioning part is comprised of a plurality of protruded parts which are protruded to the one side from the first case member and are abutted with the inner circumferential edge of the first flange part between the first pole teeth adjacent to each other in the circumferential direction of the first stator core. According to this structure, the stator is positioned in a radial direction through the first stator core with a high degree of accuracy.

In at least an embodiment of the present invention, the radial direction positioning part is provided in a non-contact state with side faces of the first pole teeth. In this case, even if the positional accuracy of the side faces is lowered due to bending of the first pole teeth, the side faces of the first pole teeth are hard to affect positioning of the first stator core with respect to the first case member. Therefore, the stator is positioned in the radial direction through the first stator core with a high degree of accuracy.

In at least an embodiment of the present invention, the first case member is provided with a first axial line direction positioning part which is abutted with the first flange part from the other side for determining a position on the other side of the stator in the motor axial line direction, and the first axial line direction positioning part is, when viewed in the motor axial line direction, a protruded part which is extended in a ring shape or a circular arc shape along the first flange part. According to this structure, only positional accuracy of the tip end face of the protruded part (abutting face with the stator) structuring the first axial line direction positioning part is required to be high and thus the stator can be positioned in the motor axial line direction with a high degree of accuracy.

In at least an embodiment of the present invention, the first case member is provided with a circumferential direction positioning part which is a protruded part fitted into a hole formed in the first flange part from the other side to position the first stator core in the circumferential direction. According to this structure, the stator is positioned in the circumferential direction through the first stator core with a high degree of accuracy.

In at least an embodiment of the present invention, a face on the one side of the first flange part is located on the one side relative to an end part on the one side of the radial direction positioning part and an end part on the one side of the circumferential direction positioning part. According to this structure, a coil bobbin is hard to interfere with the radial direction positioning part and the circumferential direction positioning part in a state that the coil bobbin is disposed on the one side with respect to the first stator core.

In at least an embodiment of the present invention, the stator includes a second stator core formed with a plurality of second pole teeth in a circumferential direction which are protruded toward the other side from an inner circumferential edge of a second flange part in a ring shape at an end part on the one side of the stator, and the support member is provided with a second axial line direction positioning part which is abutted with the second flange part from the one side for determining position on the one side of the stator.

In at least an embodiment of the present invention, the second axial line direction positioning part is a protruded part which is abutted with the second flange part from the one side. In this case, it may be structured that the second axial line direction positioning part is formed in a shape which is capable of being crushed by the second flange part and, when the first case member and the support member (the second case member) are combined with each other, the second axial line direction positioning part is brought in a crushed state by the second flange part. According to this structure, the stator can be positioned in the motor axial line direction with the first axial line direction positioning part as a reference and thus the stator is positioned with a high degree of accuracy.

In at least an embodiment of the present invention, the first case member supports an end part on the other side of a first gear support shaft of a first gear which is engaged with a rotor pinion connected with the rotor in the gear train.

In at least an embodiment of the present invention, the first case member is provided with a tube shaped body part which opens toward the one side, the support member is a second case member, and the second case member is provided with a second support part for the rotor support shaft which supports an end part on the one side of the rotor support shaft. In this case, it may be structured that the first case member is a bottomed case member having a bottom plate part and a tube shaped body part which opens toward the one side from the bottom plate part, and the stator, the rotor, the rotor support shaft and the gear train are accommodated in an inside of the bottomed case member, and the bottom plate part is formed with the radial direction positioning part, the first support part for the rotor support shaft and the first axial line direction positioning part. According to this structure, the radial direction positioning part, the first support part for the rotor support shaft and the first axial line direction positioning part are provided in the bottom plate part of the first case member which is the bottomed case member. Therefore, the motor and the gear train are disposed in a positioned state by using the first case member accommodating the motor and the gear train.

In at least an embodiment of the present invention, the support member is provided with a circumferential direction positioning part which is a protruded part fitted into a hole formed in the second flange part for positioning the stator in the circumferential direction.

In at least an embodiment of the present invention, the first case member is provided with a tube shaped body part which opens toward the one side, the support member is a stator support member, a second case member is connected with the first case member on the one side with respect to the stator support member, and the second case member is provided with a second support part for the rotor support shaft penetrating through an opening part formed in the stator support member and supporting an end part of the rotor support shaft protruded to the one side.

The geared motor to which the at least an embodiment of the present invention is applied may be used in a damper device. The damper device includes a frame in which a vent opening is formed and a baffle which is driven by the geared motor to open and close the vent opening. In a case that the geared motor to which at least an embodiment of the present invention is applied is used in a damper device, when the second case member structuring a case of the geared motor by connecting with the first case member is structured by integrally forming with the frame, the structure of the damper device can be simplified. Therefore, at least an embodiment of the present invention, it is preferable that the first case member and the second case member are made of resin.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE PREFERRED EMBODIMENTS

Figure 1A:
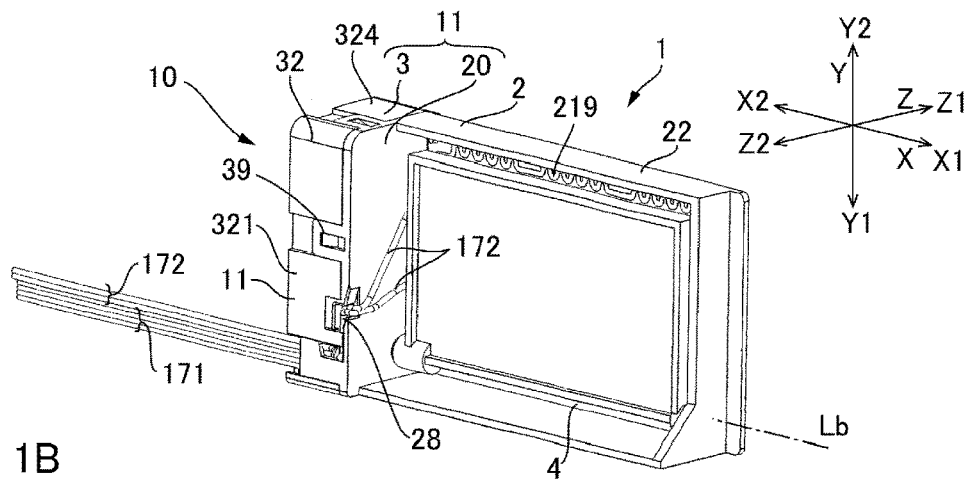
FIGS. 1A, 1B and 1C are perspective views showing a damper device on which a geared motor in accordance with a first embodiment of the present invention is mounted and which is viewed from a side where a baffle is disposed.

A geared motor and a damper device for a refrigerator to which at least an embodiment of the present invention is applied will be described below with reference to the accompanying drawings. In the following descriptions, "La" is a motor axial line direction of a rotor of a geared motor 10, "Lb" is a rotation center axial line of a sector gear 69 (output member) and a baffle 4, the "X" direction is a direction along the motor axial line direction "La" and the rotation center axial line "Lb", the "Z" direction is a direction where a vent opening 210 is directed, and the "Y" direction is a direction perpendicular to the "X" direction and the "Z" direction. Further, the "X1" is one side in the "X" direction, the "X2" is the other side in the "X" direction, the "Y1" is one side in the "Y" direction, the "Y2" is the other side in the "Y" direction, the "Z1" is one side in the "Z" direction, and the "Z2" is the other side in the "Z" direction.

Further, in the following descriptions, a first embodiment is an embodiment in which a second case member 20 disposed on one side in the motor axial line direction "La" with respect to a first case member 3 is used as a "support member". A second embodiment is an embodiment in which a "support member 8" different from a second case member 9 is disposed between a first case member 3 and the second case member 9.

[First Embodiment]

(Entire Structure)

Figure 1B:
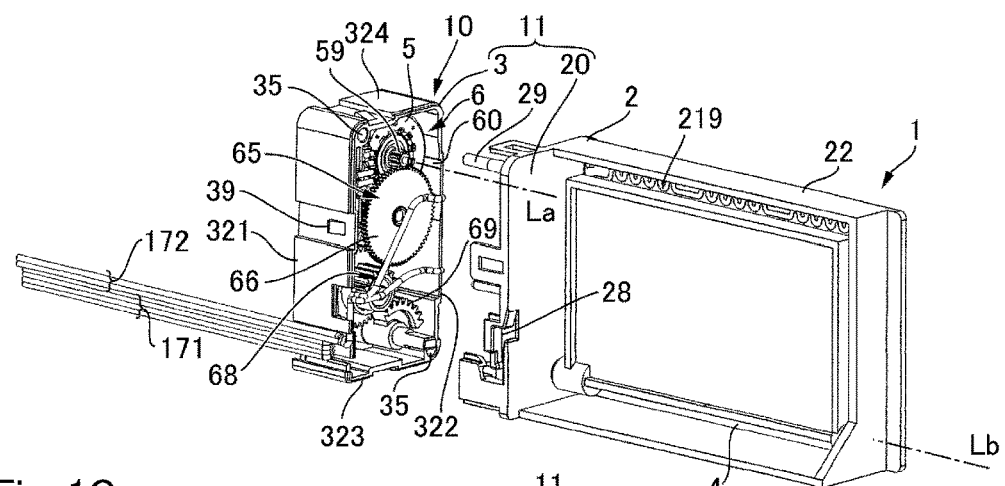
Figure 1C:
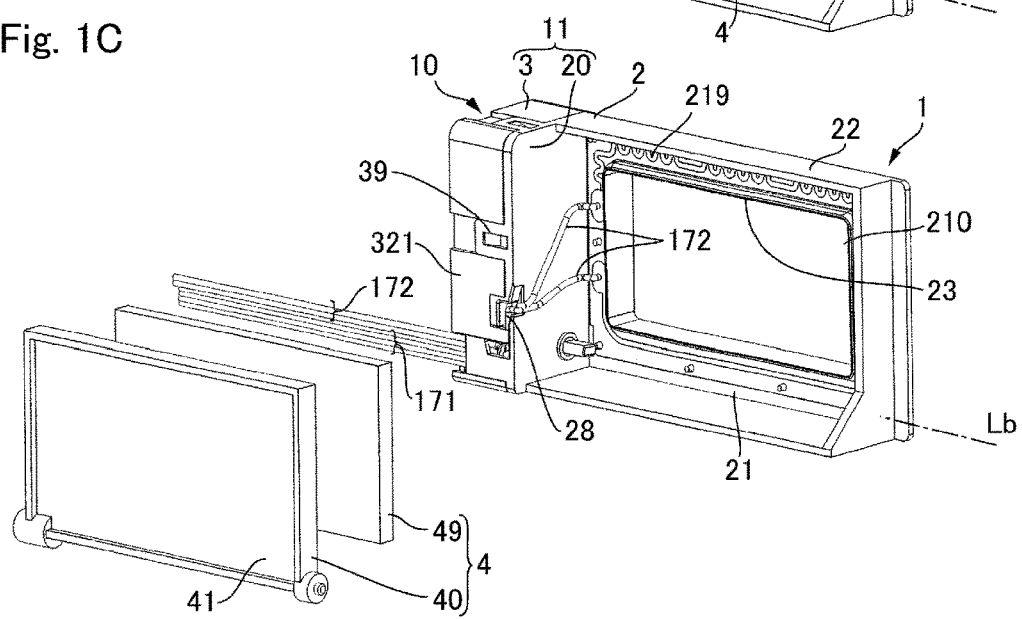
Figure 2A:
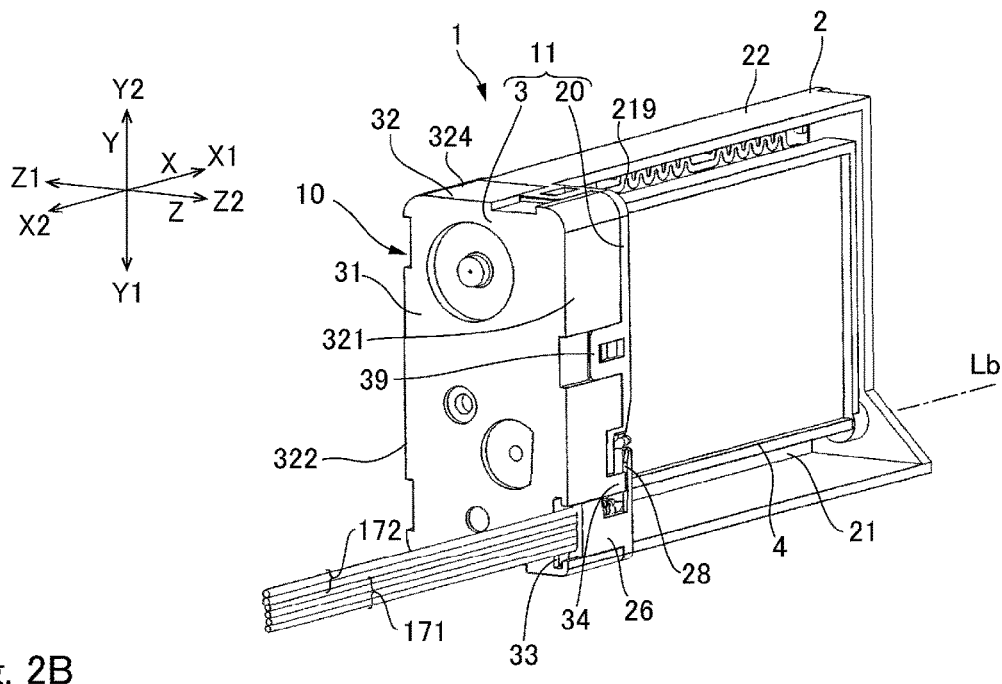
FIGS. 2A and 2B are perspective views showing the damper device in FIGS. 1A, 1B and 1C which is viewed from an opposite side to the side where the baffle is disposed.
Figure 2B:
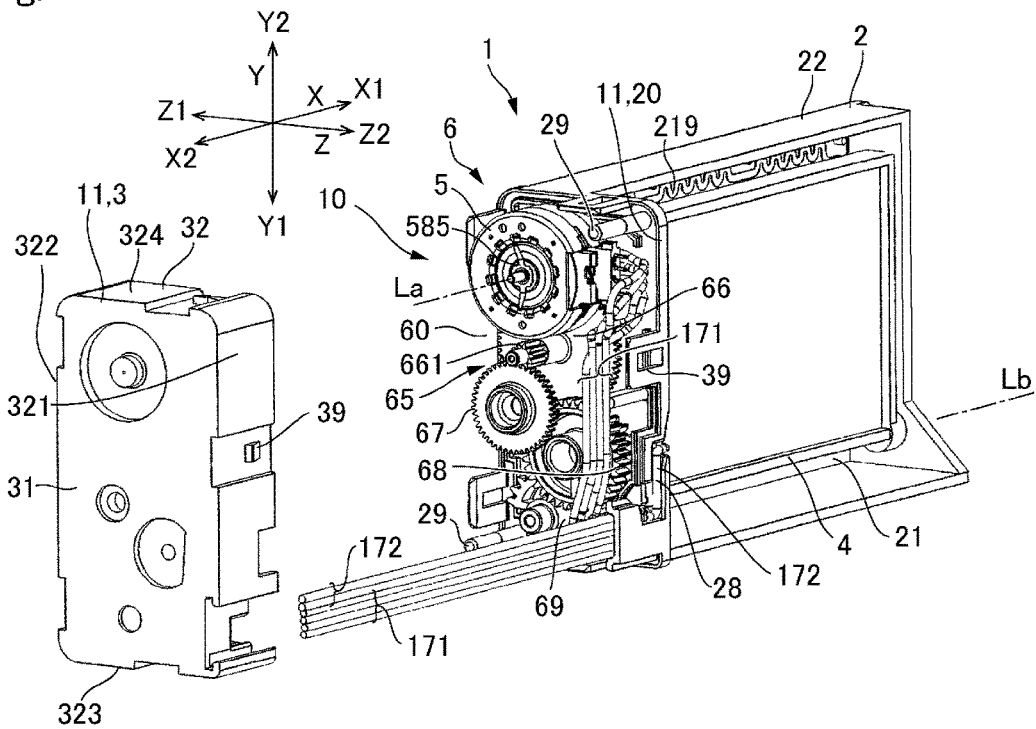

FIGS. 1A, 1B and 1C are perspective views showing a damper device 1 on which a geared motor 10 in accordance with a first embodiment of the present invention is mounted and which is viewed from a side where a baffle 4 is disposed. FIG. 1A is a perspective view showing an entire damper device 1, FIG. 1B is an exploded perspective view in which the damper device 1 is disassembled into a frame 2 and a first case member 3, and FIG. 1C is an exploded perspective view in which a baffle 4 is detached. FIGS. 2A and 2B are perspective views showing the damper device 1 in FIGS. 1A, 1B and 1C which is viewed from an opposite side to the side where the baffle 4 is disposed. FIG. 2A is a perspective view showing the entire damper device 1 and FIG. 2B is an exploded perspective view in which the damper device 1 is disassembled into the frame 2 and the first case member 3. FIGS. 1A, 1B and 1C and FIGS. 2A and 2B show a state that the baffle 4 closes a vent opening 210.

The damper device 1 shown in FIGS. 1A, 1B and 1C and FIGS. 2A and 2B includes a frame 2 formed with a rectangular vent opening 210 penetrating in the "Z" direction, a baffle 4 for opening and closing the vent opening 210 of the frame 2, a baffle drive mechanism 6 disposed on the other side "X2" in the "X" direction with respect to the baffle 4, and a first case member 3 within which the baffle drive mechanism 6 is accommodated. Therefore, the damper device 1 is structured by attaching the first case member 3, which is accommodated with the baffle drive mechanism 6 on its inner side, to the frame 2 which turnably supports the baffle 4. Specifically, as described below, the first case member 3 is attached to the second case member 20 which is integrally formed with the frame 2 by molding and thereby the damper device 1 is structured.

The first case member 3 is a bottomed case member which is provided with a bottom plate part 31 located on the other side "X2" in the "X" direction and a rectangular tube shaped body part 32 protruded to a side of the frame 2 (one side "X1" in the "X" direction) from the bottom plate part 31. The body part 32 is opened toward the one side "X1" in the "X" direction. The body part 32 is provided with side plate parts 321 and 322 facing in the "Z" direction and side plate parts 323 and 324 facing in the "Y" direction. The bottom plate part 31 and the body part 32 of the case are, when viewed in the "X" direction, formed in a quadrangular shape whose long sides are extended in the "Y" direction and short sides are extended in the "Z" direction.

A second case member 20 (support member) is formed in a portion located on the other side "X2" in the "X" direction of the frame 2 as a lid for covering an open end of the first case member 3. The first case member 3 and the second case member 20 are connected with each other by a hook mechanism 39 to structure a motor case 11 in which the motor 5 and the gear train 65 for transmitting rotation of the motor 5 to the baffle 4, i.e., the baffle drive mechanism 6 are accommodated. In this state, the first case member 3, the second case member 20 and the baffle drive mechanism 6 structure a geared motor 10. The second case member 20 is formed with shaft parts 29 and the like which are protruded to the other side "X2" in the "X" direction for positioning the first case member 3 with the second case member 20. In this embodiment, the first case member 3 and the frame 2 (second case member 20) are made of resin.

The frame 2 structuring the damper device 1 is provided with a rectangular end plate part 21, which is formed with the vent opening 210 on one side "X1" in the "X" direction with respect to the second case member 20, and a rectangular tube shaped body part 22 which is protruded to the other side "Z2" in the "Z" direction from an outer side edge of the end plate part 21. The second case member 20 is structured so that one side face of the body part 22 in a rectangular tube shape is used as a side face to which the first case member 3 is attached and held. An edge of the vent opening 210 of the end plate part 21 is formed with a seal plate part 23 in a rectangular tube shape which is protruded toward a side where the baffle 4 is located. The baffle 4 is supported by the frame 2 so as to be turnable around the rotation center axial line "Lb" extended in the "X" direction and the baffle drive mechanism 6 is structured to turn the baffle 4 around the rotation center axial line "Lb" to open or close the vent opening 210. The baffle 4 includes an opening/closing plate 40 provided with a flat plate part 41, which is larger than the vent opening 210, and a sheet-shaped elastic member 49 made of foamed polyurethane which is stuck on a face of the opening/closing plate 40 on the vent opening 210 side. The elastic member 49 is structured to abut with a portion surrounding the vent opening 210 (seal plate part 23) to close the vent opening 210. A face of the end plate part 21 of the frame 2 on a side where the baffle 4 is located is attached with a heater 219 so as to surround the vent opening 210 (so as to surround the seal plate part 23). In this embodiment, the heater 219 is formed in a seal shape.

The damper device 1 is disposed on an inner side of a duct structuring a cold air passage. In this embodiment, cold air flows through the vent opening 210 from an opposite side to a side where the baffle 4 is disposed with respect to the vent opening 210. Alternatively, cold air may flow through the vent opening 210 from a side where the baffle 4 is disposed with respect to the vent opening 210.

(Structure of Baffle Drive Mechanism 6)

In the damper device 1 and the geared motor 10 in this embodiment, the baffle drive mechanism 6 includes a motor 5 and a gear train 65 structured to transmit rotation of the motor 5 to the baffle 4 on one side "Y1" in the "Y" direction with respect to the motor 5 which are disposed on an inner side of the first case member 3. In this embodiment, the motor 5 is a stepping motor.

The gear train 65 includes a first gear 66 having a large diameter gear engaged with a rotor pinion 59, a second gear 67 having a large diameter gear engaged with a small diameter gear of the first gear 66, and a drive gear 68 having a large diameter gear engaged with a small diameter gear of the second gear 67. Therefore, in the gear train 65, the first gear 66, the second gear 67 and the drive gear 68 structure a reduction gear train. Further, the gear train 65 includes a sector gear 69 which is engaged with the drive gear 68 and is driven by the drive gear 68. The sector gear 69 is a final gear (output gear) located at the last stage of the gear train 65 and is connected with the baffle 4.

The motor 5 is connected with totaled four (4) motor lead wires 171. The motor lead wires 171 are extended from a connecting position with the motor 5 to one side "Y1" in the "Y" direction through the other side "Z2" in the "Z" direction in a drive chamber 60 disposed in an inside of the first case member 3 (inner side of the motor case 11) and then extended toward the other side "X2" in the "X" direction and led out to the outside of the first case member 3. Further, the heater 219 is connected with totaled two (2) heater lead wires 172. The heater lead wires 172 are connected with the heater 219 on one side "X1" in the "X" direction (side where the heater 219 is disposed) with respect to the second case member 20 and then led around to the other side "X2" in the "X" direction with respect to the second case member 20 through a heater lead wire passage formed in the second case member 20 and extended toward the other side "X2" in the "X" direction to the outside of the first case member 3.

In order to extend the motor lead wires 171 and the heater lead wires 172 toward the other side "X2" in the "X" direction and lead out to the outside of the first case member 3, the second case member 20 is formed with a lead wire support part 28 for supporting midway portions of the motor lead wires 171 and the heater lead wires 172 from an outer side between an outer face of the body part 32 of the first case member 3 and the second case member 20.

(Support Structure for Baffle Drive Mechanism 6)

Figure 3A:
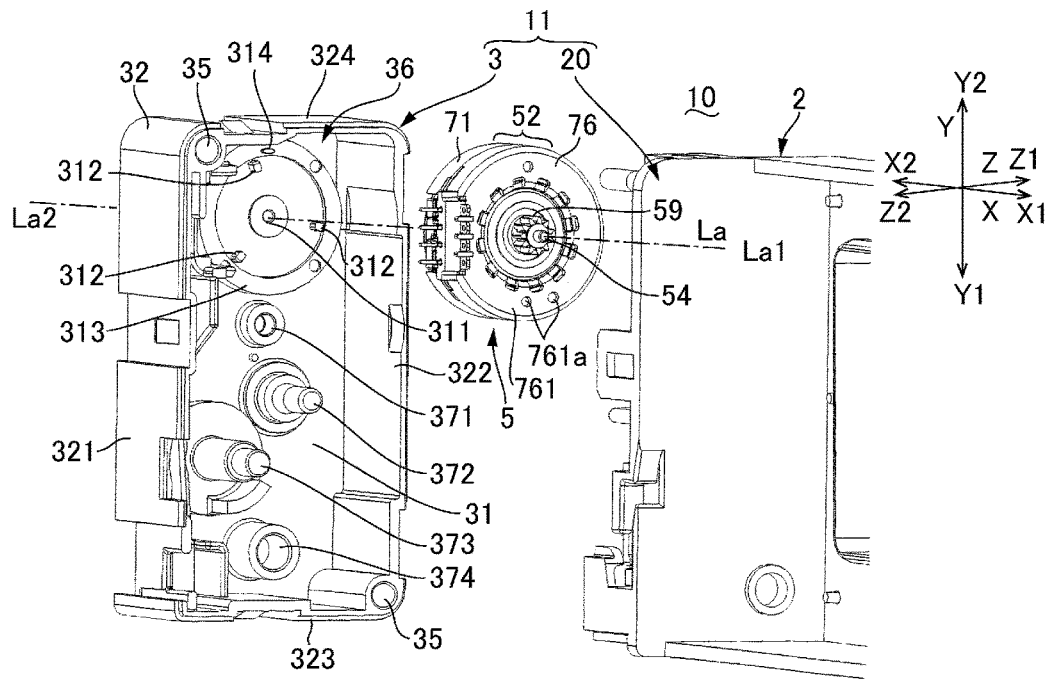
FIGS. 3A and 3B are exploded perspective views showing a support structure for a motor in the geared motor in accordance with the first embodiment of the present invention.
Figure 3B:
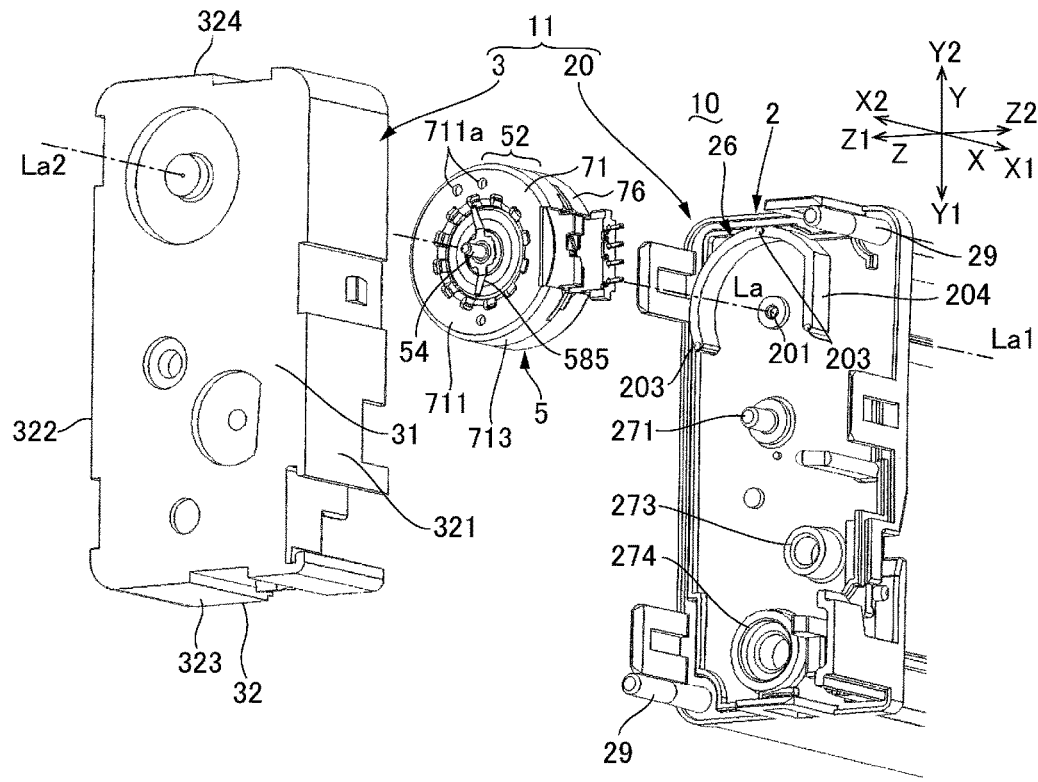

FIGS. 3A and 3B are exploded perspective views showing a support structure for the motor 5 in the geared motor 10 in accordance with the first embodiment of the present invention. FIG. 3A is an exploded perspective view which is viewed from one side "X1" in the "X" direction and FIG. 3B is an exploded perspective view which is viewed from the other side "X2" in the "X" direction.

As shown in FIGS. 3A and 3B, a face on the second case member 20 side of the bottom plate part 31 of the first case member 3 is provided, from the other side "Y2" toward one side "Y1" in the "Y" direction, with an arrangement part 36 for the motor 5, a first gear shaft support part 371 which supports the other side end part in the "X" direction of a first gear support shaft 661 (rotation shaft) of the first gear 66, a shaft-shaped projection 372 which rotatably supports the second gear 67, a shaft-shaped projection 373 which rotatably supports the drive gear 68, and a shaft hole 374 which rotatably supports a shaft of the sector gear 69 in this order. Further, the body part 32 of the first case member 3 is formed at its diagonal positions with shaft holes 35 to which the shaft parts 29 formed in the second case member 20 are fitted.

A face on the first case member 3 side of the second case member 20 is provided, from the other side "Y2" toward one side "Y1" in the "Y" direction, with an arrangement part 26 for the motor 5, a shaft-shaped projection 271 which rotatably supports the first gear 66, a shaft hole 273 formed of a tube part which rotatably supports the shaft part of the drive gear 68, and a shaft hole 274 formed of a tube part which rotatably supports the shaft part of the sector gear 69 in this order.

(Structure of Motor 5)

Figure 4A:
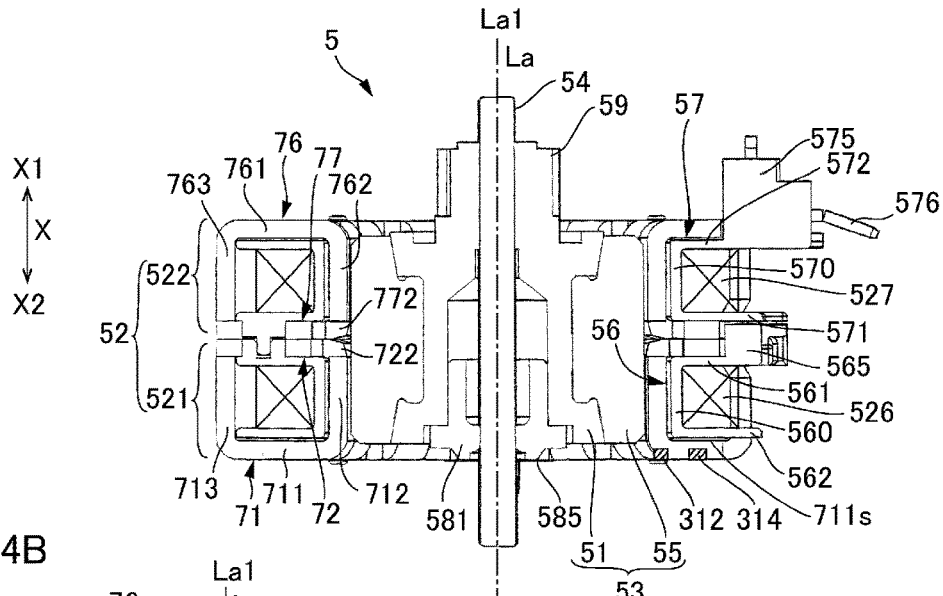
FIGS. 4A, 4B and 4C are explanatory views showing the motor of the geared motor in accordance with the first embodiment of the present invention.
Figure 4B:
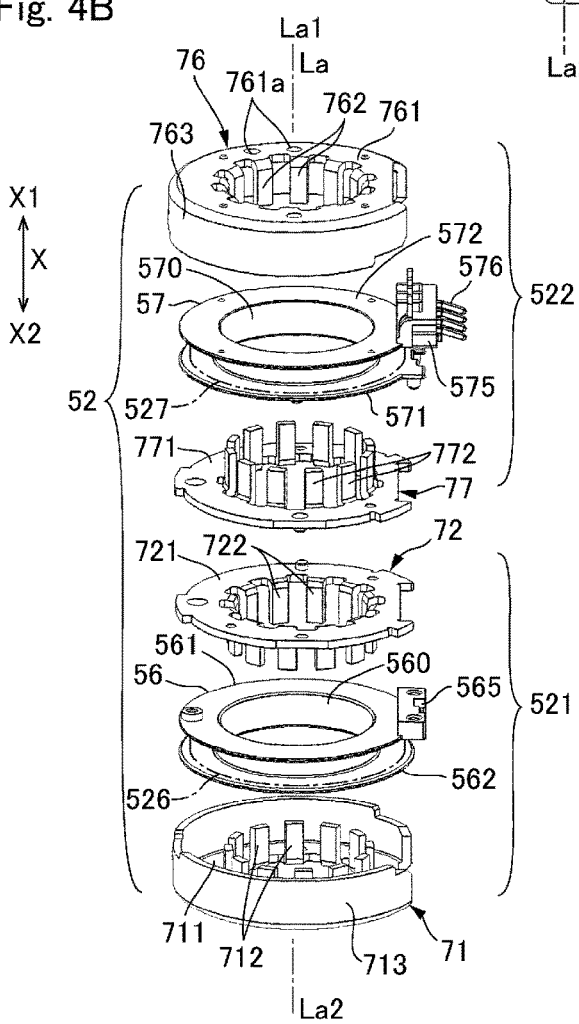
Figure 4C:
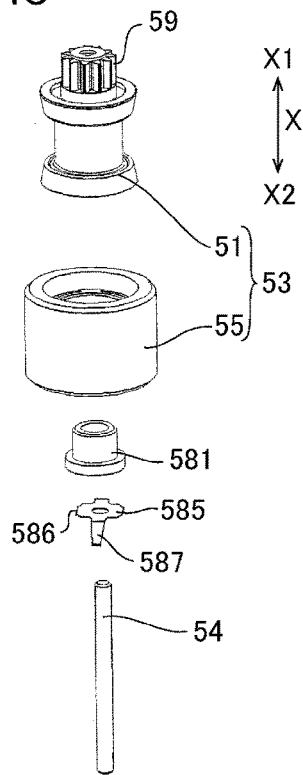

FIGS. 4A, 4B and 4C are explanatory views showing the motor 5 of the geared motor 10 in accordance with the first embodiment of the present invention. FIG. 4A is a cross-sectional view showing the motor 5, FIG. 4B is an exploded perspective view showing a stator, and FIG. 4C is an exploded perspective view showing a rotor.

As shown in FIG. 4A, the motor 5 includes a tube shaped stator 52 disposed between the bottom plate part 31 of the first case member 3 and the second case member 20, a rotor 53 disposed on an inner side of the stator 52, and a rotor support shaft 54 which rotatably supports the rotor 53. The rotor support shaft 54 may be either of a rotation shaft and a fixed shaft but, in this embodiment, the rotor support shaft 54 is a fixed shaft. Therefore, the rotor 53 rotates around the rotor support shaft 54. The rotor 53 includes a cylindrical body 51 integrally formed with a rotor pinion 59 and a cylindrical shaped rotor magnet 55 which is fixed to an outer peripheral face of the cylindrical body 51.

The rotor support shaft 54 is inserted on an inner side of the cylindrical body 51. A sleeve 581 into which the rotor support shaft 54 is inserted is attached to an inner side of the cylindrical body 51 from the other side "La2" in the motor axial line direction "La" and a plate spring 585 is disposed on the other side "La2" in the motor axial line direction "La" with respect to the sleeve 581. The plate spring 585 is provided with a circular ring-shaped part 586 into which the rotor support shaft 54 is inserted and spring parts 587 extended from the circular ring-shaped part 586. Tip end parts of the spring parts 587 are abutted with the bottom plate part 31 of the first case member 3 and thereby the rotor 53 is urged to one side "La1" in the motor axial line direction "La" through the sleeve 581.

The stator 52 includes a first stator assembly 521 and a second stator assembly 522 which are disposed along the motor axial line direction "La". The first stator assembly 521 includes a coil bobbin 56 around which a coil wire 526 is wound. The coil bobbin 56 is provided with a cylindrical shaped body part 560 and circular ring-shaped flange parts 561 and 562 which are enlarged from both end parts of the body part. The coil wire 526 is wound around the body part 560. In this embodiment, the flange part 561 is formed with a coil wire support part 565 for supporting the coil wire 526 when the coil wire 526 is to be wound. An outer stator core 71 (first stator core) made of magnetic material and an inner stator core 72 are disposed on both sides of the coil bobbin 56 so as to be superposed on each other, and the stator 52 includes the outer stator core 71 at an end part on the other side "La2" in the motor axial line direction "La".

The outer stator core 71 is provided with a circular ring-shaped flange part 711 (first flange part), pole teeth 712 (first pole teeth) which are protruded toward one side "La1" in the motor axial line direction "La" from an inner circumferential edge of the flange part 711, and a tube part 713 which is protruded toward one side "La1" in the motor axial line direction "La" from an outer circumferential edge of the flange part 711. The pole teeth 712 are formed at plural positions in the circumferential direction. In this embodiment, the flange part 711 is formed with holes 711*a* (see FIG. 3B) at three positions in the circumferential direction. The hole 711*a* is a through hole.

The inner stator core 72 is provided with a circular ring-shaped flange part 721 and pole teeth 722 protruded toward the other side "La2" in the motor axial line direction "La" from an inner circumferential edge of the flange part 721. The pole teeth 722 are formed at plural positions in the circumferential direction.

Similarly to the first stator assembly 521, the second stator assembly 522 includes a coil bobbin 57 around which a coil wire 527 is wound. The coil bobbin 57 is provided with a cylindrical shaped body part 570 and circular ring-shaped flange parts 571 and 572 which are enlarged from both end parts of the body part. The coil wire 527 is wound around the body part 570. In this embodiment, the flange part 572 is formed with a terminal block 575 which supports terminals 576. An outer stator core 76 (second stator core) made of magnetic material and an inner stator core 77 are disposed on both sides of the coil bobbin 57 so as to be superposed on each other, and the stator 52 includes the outer stator core 76 at an end part on one side "La1" in the motor axial line direction "La".

The outer stator core 76 is provided with a circular ring-shaped flange part 761 (second flange part), pole teeth 762 (second pole teeth) which are protruded toward the other side "La2" in the motor axial line direction "La" from an inner circumferential edge of the flange part 761, and a tube part 763 which is protruded toward the other side "La2" in the motor axial line direction "La" from an outer circumferential edge of the flange part 761. The pole teeth 762 are formed at plural positions in the circumferential direction. In this embodiment, the flange part 761 is formed with holes 761a at three positions in the circumferential direction. The hole 761a is a through hole.

The inner stator core 77 is provided with a circular ring-shaped flange part 771 and pole teeth 772 protruded toward one side "La1" in the motor axial line direction "La" from an inner circumferential edge of the flange part 771. The pole teeth 722 are formed at plural positions in the circumferential direction.

In the stator 52 structured as described above, a tip end part of the tube part 713 of the outer stator core 71, an outer peripheral end part of the flange part 721 of the inner stator core 72, an outer peripheral end part of the flange part 771 of the inner stator core 77, and a tip end part of the tube part 763 of the outer stator core 76 are fixed to each other by welding or the like.

(Support Structure for Motor 5 and the Like on the Other Side "La2" in Motor Axial Line Direction "La")

Figure 5A:
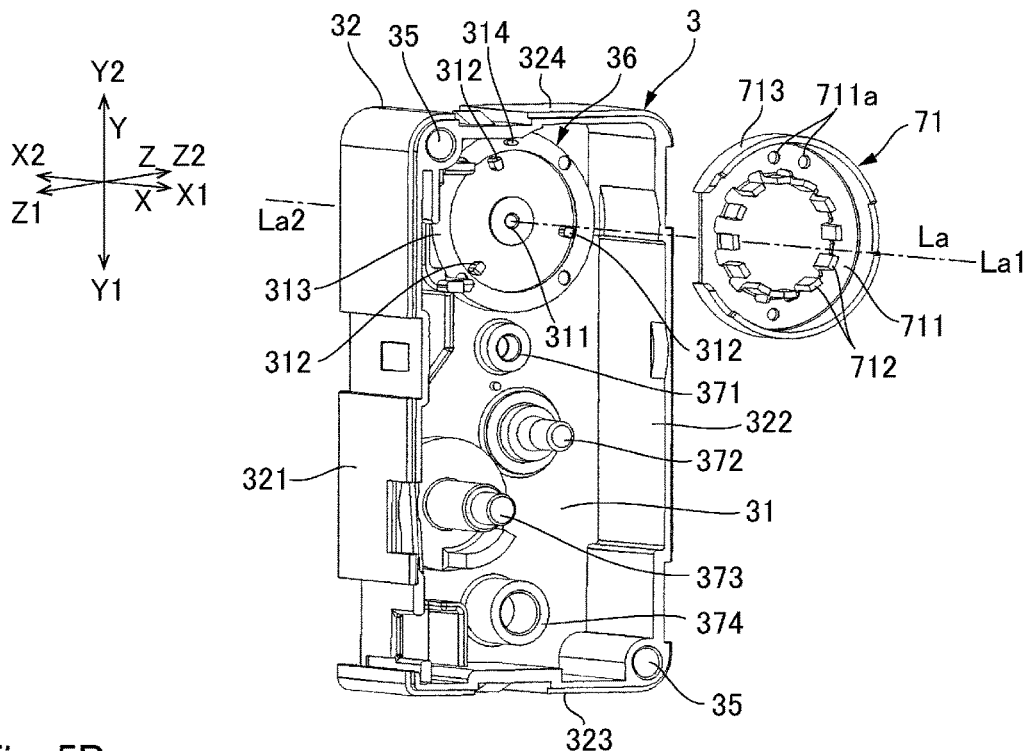
FIGS. 5A and 5B are explanatory views showing a support structure for the motor on the other side in a motor axial line direction in the geared motor in accordance with the first embodiment of the present invention.
Figure 5B:
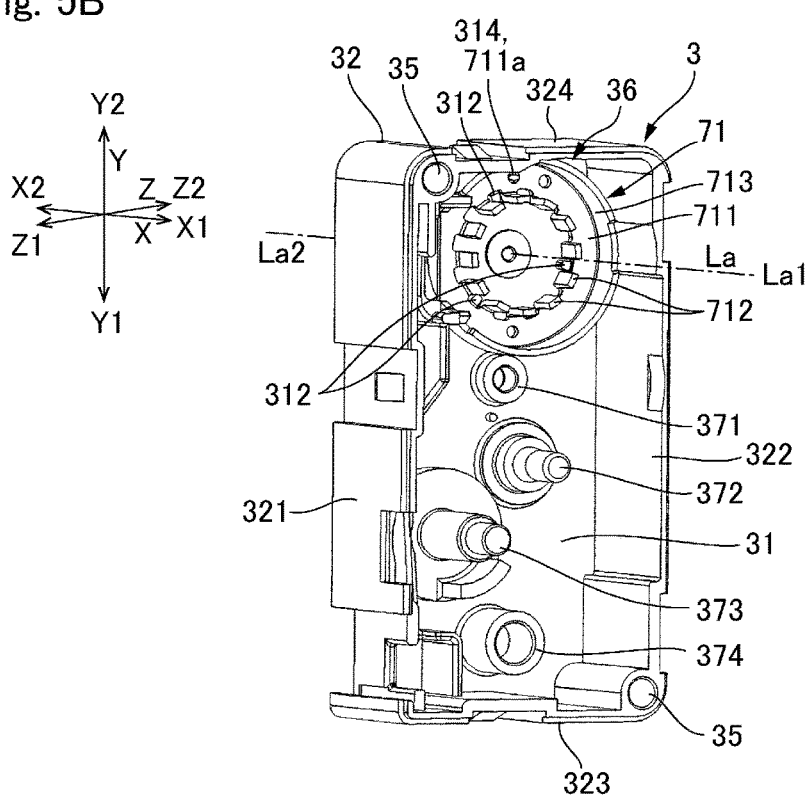
Figure 6:
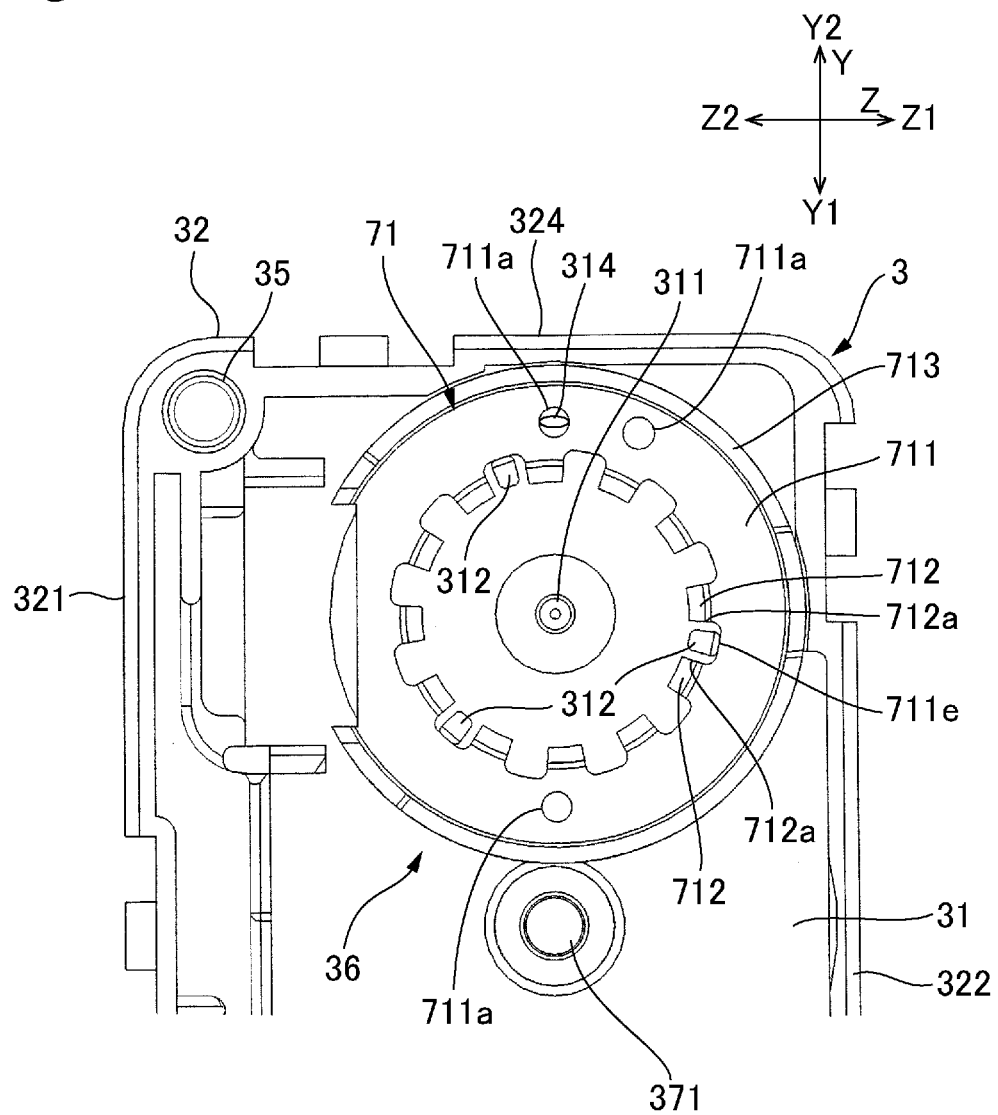
FIG. 6 is an enlarged explanatory view showing a state that a first stator core is positioned by a first case member shown in FIGS. 5A and 5B.

FIGS. 5A and 5B are explanatory views showing a support structure for the motor 5 on the other side "La2" in the motor axial line direction "La" in the geared motor 10 in accordance with the first embodiment of the present invention. FIG. 5A is an explanatory view showing a positioning part of the first case member 3 for the outer stator core 71, and FIG. 5B is an explanatory view showing a state that the outer stator core 71 is positioned by the first case member 3. FIG. 6 is an enlarged explanatory view showing a state that a first stator core is positioned by a first case member shown in FIGS. 5A and 5B.

In the geared motor 10 in this embodiment, the stator 52 is, as described below, positioned between the bottom plate part 31 of the first case member 3 and the second case member 20 (support member).

Specifically, as shown in FIG. 3A and FIGS. 5A and 5B, the arrangement part 36 for the motor 5 is provided in the bottom plate part 31 of the first case member 3 on the other side "Y2" in the "Y" direction and the stator 52 is positioned through the outer stator core 71 in the arrangement part 36. More specifically, the bottom plate part 31 of the first case member 3 is formed with a first support part 311 for the rotor support shaft, which is a shaft hole for supporting an end part on the other side "La2" in the motor axial line direction "La" of the rotor support shaft 54. Further, the bottom plate part 31 is provided with a radial direction positioning part 312, which positions the stator 52 (outer stator core 71) in the radial direction, and a first axial line direction positioning part 313 which determines a position of the stator 52 (outer stator core 71) on the other side "La2" in the motor axial line direction "La".

In this embodiment, the first axial line direction positioning part 313 is a protruded part which is integrally formed with the bottom plate part 31 and is protruded from the bottom plate part 31 to one side "La1" in the motor axial line direction "La" and is abutted with the flange part 711 from the other side "La2" in the motor axial line direction "La". In this embodiment, the first axial line direction positioning part 313 is, when viewed in the motor axial line direction "La", a flat face extended in a circular ring shape along the flange part 711 (first flange part) of the outer stator core 71. A width in a radial direction of the first axial line direction positioning part 313 is set to be smaller than that in the radial direction of the flange part 711 in a circular ring shape. In accordance with an embodiment of the present invention, it may be structured that the first axial line direction positioning part 313 is, when viewed in the motor axial line direction "La", extended in a circular arc shape along the flange part 711 (first flange part) of the outer stator core 71.

The radial direction positioning part 312 is comprised of a plurality of protruded parts which are integrally formed with the bottom plate part 31 and are protruded from the bottom plate part 31 to one side "La1" in the motor axial line direction "La" on an inner side in a radial direction with respect to the first axial line direction positioning part 313. The radial direction positioning part 312 is abutted with an inner circumferential edge of the flange part 711 between the pole teeth 712 of the outer stator core 71 adjacent to each other in the circumferential direction. In this embodiment, the radial direction positioning part 312 is provided at plural positions in the circumferential direction.

In this embodiment, the radial direction positioning part 312 is, as shown in FIG. 6, abutted with the inner circumferential edge 711e of the flange part 711 to position in the radial direction but is set in a non-contact state with side faces 712a of the pole teeth 712. In other words, the radial direction positioning part 312 (protruded part) is separated from the side faces 712a of the pole teeth 712 and is not contacted with the side faces 712a. According to this structure, for example, even in a case that positional accuracy of the side faces 712a of the pole teeth 712 is low due to bending of the pole teeth 712 after punching in a shape of the pole teeth, positioning of the outer stator core 71 to the first case member 3 is hard to be affected by the side faces 712a of the pole teeth 712. Therefore, the stator 52 is positioned in the radial direction through the outer stator core 71 with a high degree of accuracy.

Further, the bottom plate part 31 of the first case member 3 is provided with a circumferential direction positioning part 314 which positions the stator 52 (outer stator core 71) in the circumferential direction. In this embodiment, the circumferential direction positioning part 314 is a protruded part which is protruded from the first axial line direction positioning part 313 to one side "La1" in the motor axial line direction "La" and is fitted to one of three holes 711a of the flange part 711. The hole 711a is formed in a circular shape and the circumferential direction positioning part 314 is formed in an elliptic shape or a long round shape whose major axis is directed in the circumferential direction. Further, a dimension in the circumferential direction of the circumferential direction positioning part 314 is equal to an inner diameter of the hole 711a but its dimension in the radial direction is smaller than an inner diameter of the hole 711a. Therefore, the circumferential direction positioning part 314 is contacted with an inner circumferential edge of the hole 711a in the circumferential direction but is not contacted with its inner circumferential edge in the radial direction. Accordingly, although the circumferential direction positioning part 314 performs positioning of the stator 52 (outer stator core 71) in the circumferential direction but does not perform positioning in the radial direction. Positioning of the stator 52 in the radial direction is performed by the radial direction positioning part 312.

In this embodiment, as schematically shown in FIG. 4A, a face 711s on one side "La1" in the motor axial line direction "La" of the flange part 711 is located on the one side "La1" with respect to an end part of the radial direction positioning part 312 on the one side "La1" in the motor axial line direction "La" and an end part of the circumferential direction positioning part 314 on the one side "La1" in the motor axial line direction "La". Therefore, the radial direction positioning part 312 and the circumferential direction positioning part 314 are not protruded to the one side "La1" in the motor axial line direction "La" relative to the flange part 711. In other words, protruding amounts in the motor axial line direction "La" of the radial direction positioning part 312 and the circumferential direction positioning part 314 with respect to the flat face of the first axial line direction positioning part 313 with which the flange part 711 is abutted is set to be smaller than a plate thickness of the flange part 711. Accordingly, the coil bobbin 56 is hard to be interfered with the radial direction positioning part 312 and the circumferential direction positioning part 314 on the one side "La1" in the motor axial line direction "La" with respect to the outer stator core 71.

(Support Structure for Motor 5 and the Like on One Side "La1" of Motor Axial Line Direction "La")

Figure 7A:
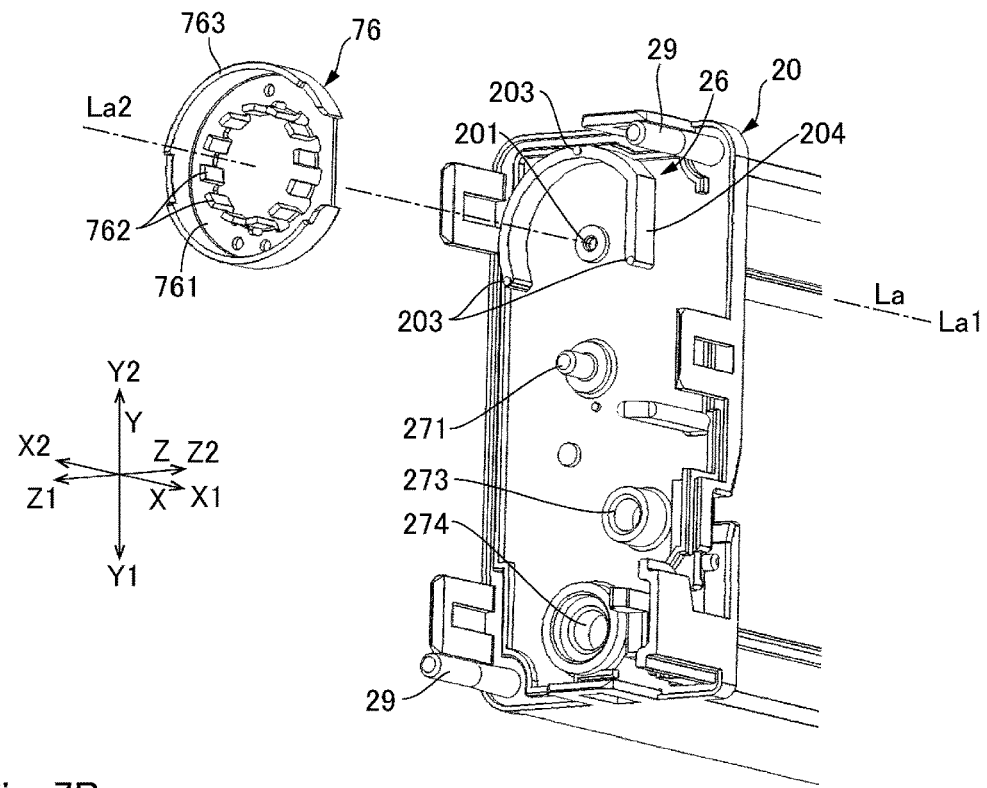
FIGS. 7A and 7B are explanatory views showing a support structure for the motor on one side in the motor axial line direction in the geared motor in accordance with the first embodiment of the present invention.
Figure 7B:
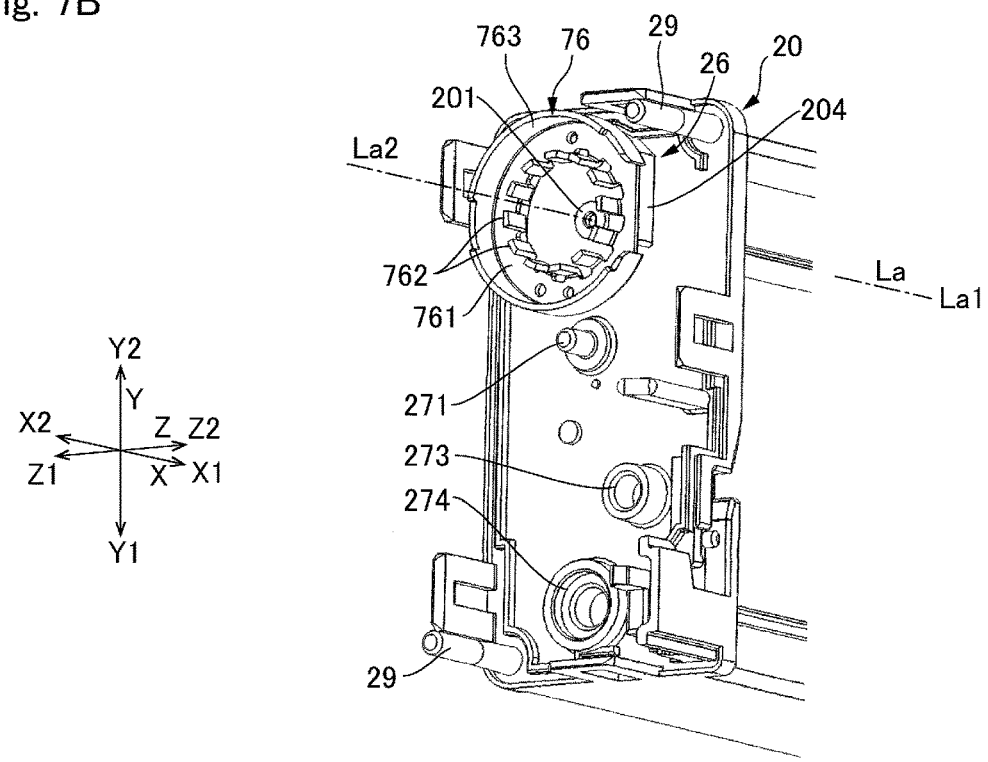

FIGS. 7A and 7B are explanatory views showing a support structure for the motor 5 on one side "La1" in the motor axial line direction "La" in the geared motor 10 in accordance with the first embodiment of the present invention. FIG. 7A is an explanatory view showing a positioning part of the second case member 20 for the outer stator core 76 and FIG. 7B is an explanatory view showing a state that the outer stator core 76 is positioned by the second case member 20.

As shown in FIG. 3B and FIGS. 7A and 7B, in the second case member 20 which is one side face of the body part 22 in a rectangular tube shape of the frame 2, the stator 52 is positioned in an arrangement part 26 for the motor 5 through the outer stator core 76. More specifically, the second case member 20 is formed with a second support part 201 for the rotor support shaft which is a shaft hole for supporting an end part of the rotor support shaft 54 on one side "La1" in the motor axial line direction "La" and is provided with a second axial line direction positioning part 203 which determines position of the stator 52 (outer stator core 76) on one side "La1" in the motor axial line direction "La".

In this embodiment, the second case member 20 is, when viewed in the motor axial line direction "La", formed with a protruded part 204 which is extended in a circular arc shape along the flange part 761 of the outer stator core 76 (second flange part). A face of the protruded part 204 on the other side "La2" in the motor axial line direction "La" is provided with a plurality of second axial line direction positioning parts 203 which are protruded parts (small projection) protruded to the other side "La2" in the motor axial line direction "La" at positions separated from each other in a circumferential direction. The second axial line direction positioning part 203 is abutted with the flange part 761 of the outer stator core 76 from one side "La1" in the motor axial line direction "La" to determine the position of the stator 52 (outer stator core 71) on one side "La1" in the motor axial line direction "La". In this case, the second axial line direction positioning part 203 determines the position of the flange part 761 on one side "La1" in the motor axial line direction "La" in a partially crushed state by the flange part 761. In other words, the protruded parts (small projection) are structured in a small projection so that, when the first case member 3 and the second case member 20 are connected with and fixed to each other, the second axial line direction positioning parts 203 can be crushed with the first axial line direction positioning part 313 as a reference. As a result, the stator 52 is surely fixed between the first axial line direction positioning part 313 and the second axial line direction positioning part 203 in the axial line direction.

(Principal Effects in this Embodiment)

As described above, in the damper device 1 and the geared motor 10 in this embodiment, the stator 52 is positioned by the radial direction positioning part 312 of the first case member 3 in the radial direction and the rotor support shaft 54 is supported by the first support part 311 for the rotor support shaft of the first case member 3. Therefore, the stator 52 and the rotor support shaft 54 are positioned through the first case member 3 with a high degree of accuracy and thus the stator 52 and the rotor support shaft 54 are not required to be positioned by an end plate which is fixed to an end face of the stator 52. Accordingly, the number of components is reduced and productivity of the geared motor 10 is improved and thus cost of the geared motor 10 can be reduced.

Further, the first case member 3 is formed with the first gear shaft support part 371 which supports the first gear support shaft 661 (rotation shaft) of the first gear 66 and thus the rotor pinion 59 and the first gear 66 can be appropriately engaged with each other. Therefore, generation of abnormal noise and abrasion can be suppressed.

Further, the radial direction positioning part 312 is comprised of a plurality of the protruded parts which are abutted with the inner circumferential edge of the flange part 711 between the pole teeth 712 of the outer stator core 71 adjacent to each other in the circumferential direction and the radial direction positioning part 312 positions the outer stator core 71 with the inner circumferential edge of the flange part 711 as a reference. Therefore, the stator 52 is positioned in the radial direction through the outer stator core 71 with a high degree of accuracy and thus high concentricity of the stator 52 with the rotor 53 is attained.

Further, the first case member 3 is provided with the first axial line direction positioning part 313. The first axial line direction positioning part 313 is, when viewed in the motor axial line direction "La", a protruded part which is extended in a ring shape along the flange part 711. Therefore, when the first case member 3 is to be molded out of resin, shrinking and the like are hard to be occurred. Further, only positional accuracy of the tip end face of the protruded part (abutting face with the stator 52) structuring the first axial line direction positioning part 313 is required to be high and thus the stator 52 can be positioned in the motor axial line direction "La" with a high degree of accuracy.

Further, the first case member 3 is provided with the circumferential direction positioning part 314 which is a protruded part fitted into the hole 711a formed in the flange part 711 of the outer stator core 71 to position the outer stator core 71 in the circumferential direction. Therefore, the stator 52 is positioned in the circumferential direction through the outer stator core 71.

Further, the second case member 20 which is used as a support member in this embodiment is provided with the second axial line direction positioning part 203 which is a protruded part abutted with the flange part 761 of the outer stator core 76 to determine the position of the stator 52 on one side "La1" in the motor axial line direction "La". Therefore, the position in the motor axial line direction "La" of the stator 52 is determined between the first case member 3 and the second case member 20.

[Second Embodiment]

Figure 8:
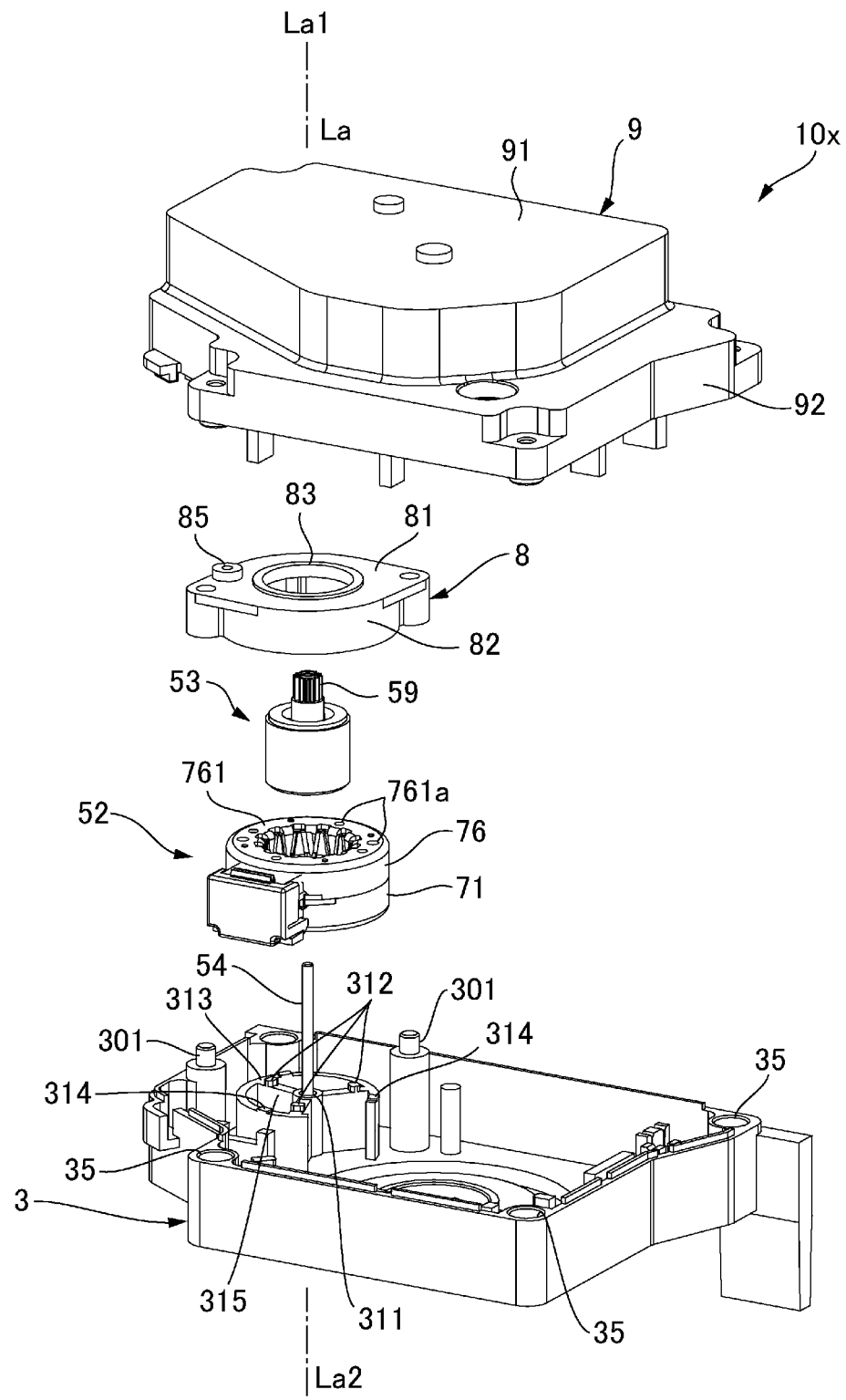
FIG. 8 is an exploded perspective view showing a geared motor in accordance with a second embodiment of the present invention which is viewed from one side in a motor axial line direction.
Figure 9:
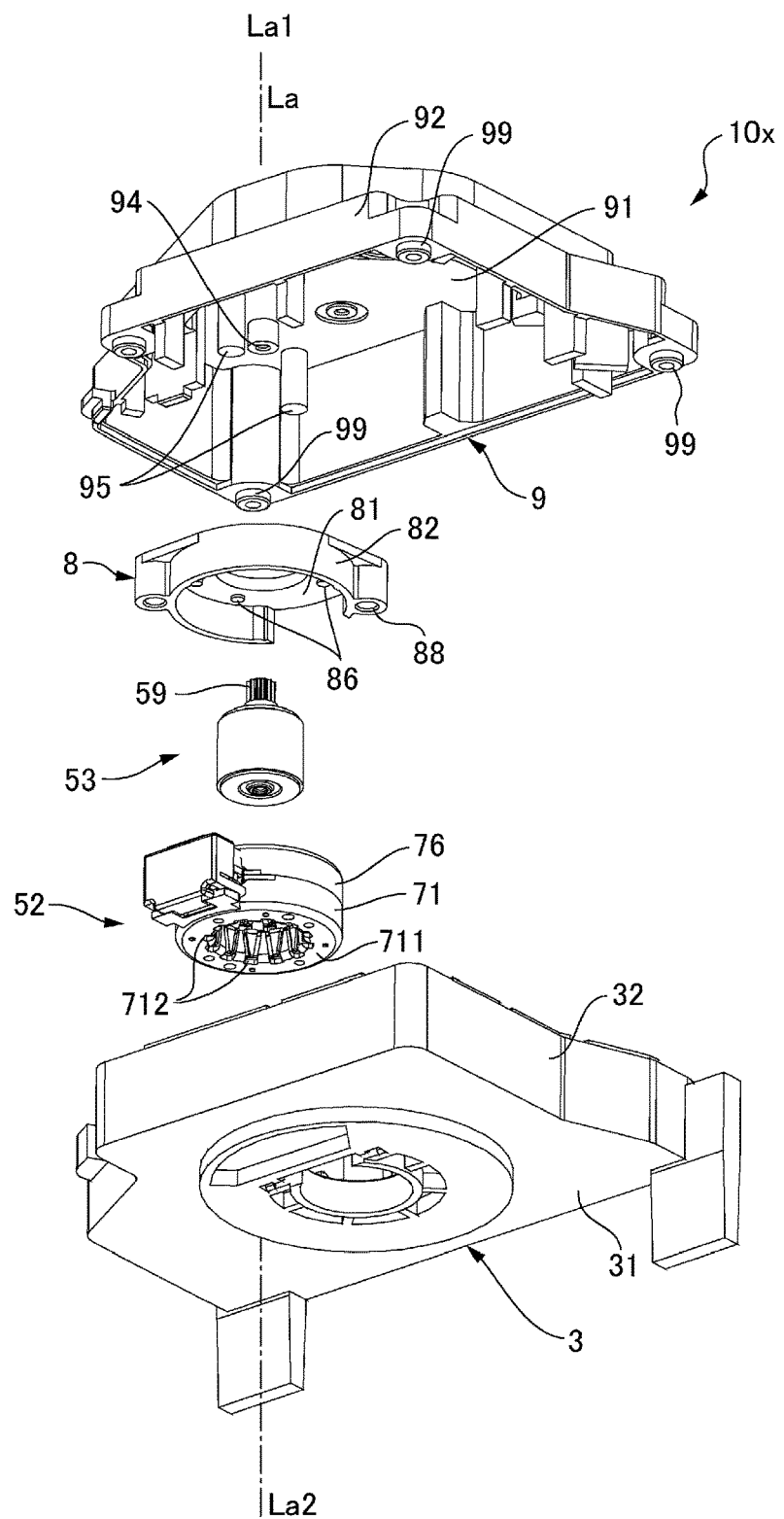
FIG. 9 is an exploded perspective view showing the geared motor in accordance with the second embodiment of the present invention which is viewed from the other side in the motor axial line direction.

FIG. 8 is an exploded perspective view showing a geared motor 10x in accordance with a second embodiment of the present invention which is viewed from one side "La1" in a motor axial line direction "La". FIG. 9 is an exploded perspective view showing the geared motor 10x in accordance with the second embodiment of the present invention which is viewed from the other side "La2" in the motor axial line direction "La". In FIGS. 8 and 9, the gears and the like are not shown.

In the geared motor 10x shown in FIGS. 8 and 9, the second case member 9 is disposed on one side "La1" in the motor axial line direction "La" with respect to the first case member 3. A support member 8 connected with the first case member 3 is disposed between the first case member 3 and the second case member 9. In this embodiment, the support member 8 is, as described below, a stator support member which supports a stator 52 of the motor 5 between the first case member 3 and the support member 8.

More specifically, the support member 8 is provided with a bottom plate part 81 and a tube shaped body part 82 which is protruded from an outer side edge of the bottom plate part 81 toward the other side "La2" in the motor axial line direction "La". The bottom plate part 81 is formed with an opening part 83 through which a rotor support shaft 54 and a rotor pinion 59 are protruded to one side "La1" in the motor axial line direction "La". In this embodiment, the first case member 3 is formed with connecting shafts 301 which are protruded toward one side "La1" in the motor axial line direction "La" and the support member 8 is formed with shaft holes 88 into which the connecting shafts 301 are fitted. The first case member 3 and the support member 8 are positioned each other by fitting the connecting shafts 301 into the shaft holes 88 and, in this state, the first case member 3 and the support member 8 are connected with each other.

The second case member 9 is provided with a bottom plate part 91 and a tube shaped body part 92 which is protruded from an outer side edge of the bottom plate part 91 to the other side "La2" in the motor axial line direction "La". In this embodiment, the second case member 9 is formed with connecting shafts 99 which are protruded toward the other side "La2" in the motor axial line direction "La", and the first case member 3 is formed with shaft holes 35 into which the connecting shafts 99 are fitted. The first case member 3 and the second case member 9 are positioned each other by fitting the connecting shafts 99 into the shaft holes 35 and, in this state, the first case member 3 and the second case member 9 are connected with each other. Further, the second case member 9 is formed with positioning shafts 95 which are protruded toward the other side "La2" in the motor axial line direction "La" and are abutted with the support member 8 and thereby position in the motor axial line direction "La" of the support member 8 is determined.

The bottom plate part 91 of the second case member 9 is formed with a second support part 94 for a rotor support shaft which is a shaft hole for supporting an end part of the rotor support shaft 54 on one side "La1" in the motor axial line direction "La".

The bottom plate part 31 of the first case member 3 is formed with a first support part 311 for a rotor support shaft formed in a tube shape which is a shaft hole for supporting an end part of the rotor support shaft 54 on the other side "La2" in the motor axial line direction "La". Further, the bottom plate part 31 is formed with a radial direction positioning part 312 which positions the stator 52 (outer stator core 71) in a radial direction and a first axial line direction positioning part 313 which determines position of the stator 52 (outer stator core 71) on the other side "La2" in the motor axial line direction "La".

In this embodiment, the first axial line direction positioning part 313 is a protruded part which is protruded from the bottom plate part 31 to one side "La1" in the motor axial line direction "La" and is abutted with the flange part 711 from the other side "La2" in the motor axial line direction "La". In this embodiment, the first axial line direction positioning part 313 is, when viewed in the motor axial line direction "La", extended in a circular arc shape along the flange part 711 (first flange part) of the outer stator core 71. The first axial line direction positioning part 313 and the first support part 311 formed in a tube shape for the rotor support shaft are connected with each other by plate-shaped ribs 315.

The radial direction positioning part 312 is comprised of a plurality of protruded parts which are respectively protruded from the ribs 315 to one side "La1" in the motor axial line direction "La" and are respectively abutted with an inner circumferential edge of the flange part 711 between pole teeth 712 of the outer stator core 71 adjacent to each other in a circumferential direction. In this embodiment, the radial direction positioning part 312 is provided at three positions in the circumferential direction.

Further, the first case member 3 is provided with a circumferential direction positioning part 314 which positions the stator 52 (outer stator core 71) in the circumferential direction. In this embodiment, the circumferential direction positioning part 314 is a protruded part which is protruded from the first axial line direction positioning part 313 to one side "La1" in the motor axial line direction "La" and is fitted into a hole 711a of the flange part 711.

In the support member 8, the bottom plate part 81 serves as a second axial line direction positioning part which is abutted with the flange part 761 of the outer stator core 76 from one side "La1" in the motor axial line direction "La" to determine position of the stator 52. Further, the bottom plate part 81 of the support member 8 is formed with protruded parts 86 which are protruded from the bottom plate part 81 to the other side "La2" in the motor axial line direction "La" and are fitted into holes 761a of the flange part 711 of the outer stator core 76. The protruded parts 86 function as a radial direction positioning part for positioning the stator 52 (outer stator core 76) in a radial direction and a circumferential direction positioning part for positioning the stator 52 (outer stator core 76) in a circumferential direction.

In addition, the support member 8 is formed with a first gear shaft support part 85 which supports a first gear support shaft (rotation shaft) of a first gear (not shown) engaged with the rotor pinion 59 in the gear train.

Also in the geared motor 10x structured as described above, similarly to the first embodiment, the stator 52 is positioned in the radial direction by the radial direction positioning part 312 of the first case member 3, and the rotor support shaft 54 is supported by the first support part 311 for the rotor support shaft of the first case member 3. Therefore, the stator 52 and the rotor support shaft 54 are positioned through the first case member 3 with a high degree of accuracy and thus the stator 52 and the rotor support shaft 54 are not required to be positioned by an end plate which is fixed to an end face of the stator 52. Accordingly, the number of components is reduced and the productivity is improved and thus similar effects to those of the first embodiment are attained, for example, cost of the geared motor 10x can be reduced.

[Other Embodiments]

Although the present invention has been shown and described with reference to a specific embodiment, various changes and modifications will be apparent to those skilled in the art from the teachings herein. For example, the present invention may be applied to a case that the second case member 20 is separately provided from the frame 2. Further, the damper device 1 in the embodiment described above is used in a refrigerator but the present invention is not limited to a damper device used in a refrigerator.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A geared motor comprising:
   a first case member;
   a support member which is disposed on one side in a motor axial line direction with respect to the first case member and is connected with the first case member;
   a stator in a tube shape which is disposed between the first case member and the support member;
   a rotor which is disposed on an inner side with respect to the stator;
   a rotor support shaft which rotatably supports the rotor; and
   a gear train structured to transmit rotation of the rotor;
   wherein the first case member is a bottomed case member comprising a bottom plate part on which the stator, the rotor, and the gear train are disposed, and a tube shaped body part protruded to the one side in the motor axial line direction from the bottom plate part;
   wherein the stator comprises a first stator core formed with a plurality of first pole teeth in a circumferential direction which are protruded toward the one side from an inner circumferential edge of a first flange part in a ring shape at an end part on another side of the stator;
   wherein the bottom plate part is formed with support parts which rotatably support the gear train, a radial direction positioning part which positions the stator in a radial direction, a first support part for the rotor support shaft which supports an end part on another side in the motor axial line direction of the rotor support shaft, and a first axial line direction positioning part which is abutted with the first flange part from the other side for determining a position on the other side of the stator in the motor axial line direction; and
   wherein the radial direction positioning part comprises a plurality of protruded parts which are protruded from the bottom plate part to the one side on an inner side in the radial direction with respect to the first axial line direction positioning part and are abutted with the inner circumferential edge of the first flange part between the first pole teeth adjacent to each other in the circumferential direction of the first stator core.

2. The geared motor according to claim 1, wherein the radial direction positioning part is provided in a non-contact state with side faces of the first pole teeth.

3. The geared motor according to claim 1, wherein
   the first axial line direction positioning part is, when viewed in the motor axial line direction, a protruded part which is extended in a ring shape or a circular arc shape along the first flange part.

4. The geared motor according to claim 1, wherein the first case member is provided with a circumferential direction positioning part which is a protruded part fitted into a hole formed in the first flange part from the other side for determining a position of the first stator core in the circumferential direction.

5. The geared motor according to claim 4, wherein a face on the one side of the first flange part is located on the one side relative to an end part on the one side of the radial direction positioning part and an end part on the one side of the circumferential direction positioning part.

6. The geared motor according to claim 1, wherein
   the stator includes a second stator core formed with a plurality of second pole teeth in a circumferential direction which are protruded toward the other side from an inner circumferential edge of a second flange part in a ring shape at an end part on the one side of the stator, and
   the support member is provided with a second axial line direction positioning part which is abutted with the second flange part from the one side for determining a position on the one side of the stator.

7. The geared motor according to claim 6, wherein the second axial line direction positioning part is a protruded part which is abutted with the second flange part from the one side.

8. The geared motor according to claim 6, wherein the support member is provided with a circumferential direction positioning part which is a protruded part fitted into a hole formed in the second flange part for positioning the stator in the circumferential direction.

9. The geared motor according to claim 8, wherein
   the support member is a stator support member,
   a second case member is connected with the first case member on the one side with respect to the stator support member, and
   the second case member is provided with a second support part for the rotor support shaft penetrating through an opening part formed in the stator support member and supporting an end part of the rotor support shaft protruded to the one side.

10. The geared motor according to claim 1, wherein the bottom plate part supports an end part on the other side of a first gear support shaft of a first gear which is engaged with a rotor pinion connected with the rotor in the gear train.

11. The geared motor according to claim 1, wherein
    the support member is a second case member, and
    the second case member is provided with a second support part for the rotor support shaft which supports an end part on the one side of the rotor support shaft.

* * * * *